(12) United States Patent
Brück

(10) Patent No.: US 10,301,994 B2
(45) Date of Patent: May 28, 2019

(54) TANK FOR AN OPERATING LIQUID FOR A MOTOR VEHICLE

(71) Applicant: CONTINENTAL AUTOMOTIVE GMBH, Hannover (DE)

(72) Inventor: Rolf Brück, Bergisch Gladbach (DE)

(73) Assignee: Continental Automotive GmbH, Hannover (DE)

( * ) Notice: Subject to any disclaimer, the term of this patent is extended or adjusted under 35 U.S.C. 154(b) by 121 days.

(21) Appl. No.: 15/437,525

(22) Filed: Feb. 21, 2017

(65) Prior Publication Data

US 2017/0159527 A1   Jun. 8, 2017

Related U.S. Application Data

(63) Continuation of application No. PCT/EP2015/068142, filed on Aug. 6, 2015.

(30) Foreign Application Priority Data

Aug. 26, 2014 (DE) .................. 10 2014 112 227

(51) Int. Cl.
*F01N 3/20* (2006.01)
*F01N 13/18* (2010.01)
(Continued)

(52) U.S. Cl.
CPC ............ *F01N 3/2066* (2013.01); *B60K 13/04* (2013.01); *F01N 13/1827* (2013.01);
(Continued)

(58) Field of Classification Search
CPC ............... F01N 3/2066; F01N 2260/10; F01N 2610/02; F01N 2610/1406; F01N 2610/1433
See application file for complete search history.

(56) References Cited

U.S. PATENT DOCUMENTS

2012/0311999 A1   12/2012   Hodgson et al.
2013/0327026 A1*  12/2013   Bauer ................... F01N 3/2066
                                                           60/295

FOREIGN PATENT DOCUMENTS

CN          103261605 A       8/2013
DE     10 2009 000 101 A1    7/2010
(Continued)

OTHER PUBLICATIONS

International Search Report and Written Opinion dated Nov. 2, 2015 from corresponding International Patent Application No. PCT/EP2015/068142.
(Continued)

*Primary Examiner* — Audrey K Bradley

(57) ABSTRACT

Tank for an operating liquid for a motor vehicle. Tank (1) for an operating liquid for a motor vehicle (2) with a tank wall (3) made of plastic, having an opening (4) and an insert (5), made of metal, arranged at the opening (4), and a flexible sealing element (6) for interconnecting, in a liquid-tight manner, the tank wall (3) and the insert (5), wherein, on account of thermal expansion of the tank wall (3) and of the insert (5), relative displacements (7) arise between the tank wall (3) and the insert (5) and the flexible sealing element (6) is configured such that sealing faces (8, 16) are formed both on the insert (5) and on the tank wall (3), against which faces the sealing element (6) bears independently of the relative displacements (7).

4 Claims, 3 Drawing Sheets

(51) Int. Cl.
*B60K 13/04* (2006.01)
*B60K 15/03* (2006.01)

(52) U.S. Cl.
CPC .......................... *B60K 2015/03427* (2013.01); *F01N 2260/10* (2013.01); *F01N 2610/02* (2013.01); *F01N 2610/1406* (2013.01); *F01N 2610/1433* (2013.01); *Y02A 50/2325* (2018.01); *Y02T 10/24* (2013.01)

(56) References Cited

FOREIGN PATENT DOCUMENTS

| | | | |
|---|---|---|---|
| DE | 10 2009 042 510 A1 | 6/2011 | |
| DE | 202010012620 U1 * | 6/2011 | ........... F01N 3/2066 |
| DE | 10 2010 014314 A1 | 10/2011 | |
| DE | 10 2011 010 640 A1 | 8/2012 | |
| DE | 10 2011 014634 A1 | 9/2012 | |
| DE | 10 2011 118652 A1 | 5/2013 | |
| DE | 10 2013 106 167 A1 | 12/2014 | |

OTHER PUBLICATIONS

German Patent Office Search Report dated Apr. 30, 2015 from corresponding German Patent Application 10 2014 112 227.5.

\* cited by examiner

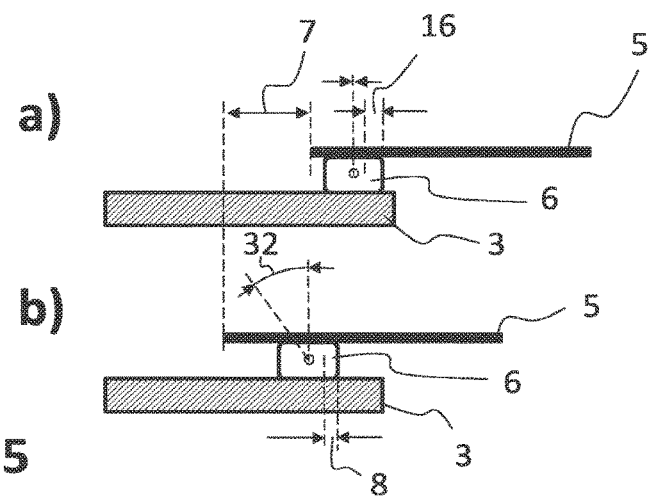
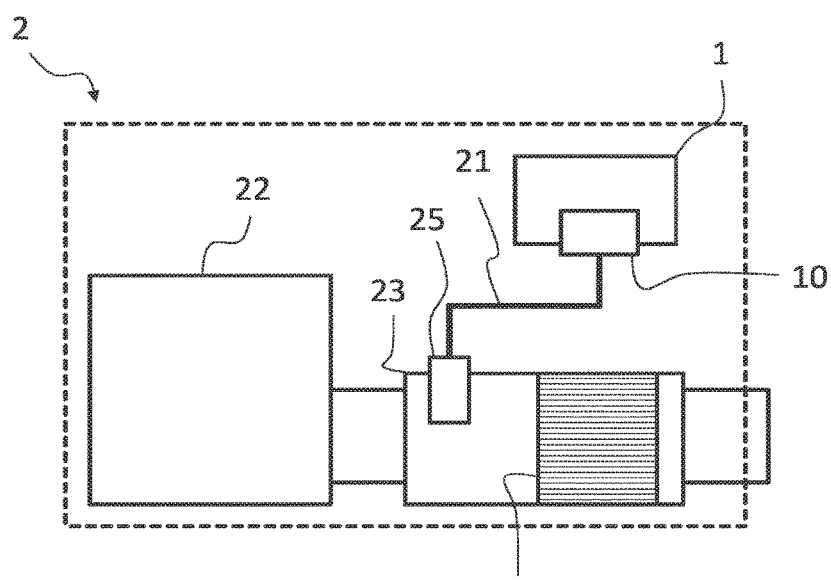
Fig. 5
Fig. 6

TANK FOR AN OPERATING LIQUID FOR A MOTOR VEHICLE

CROSS-REFERENCE TO RELATED APPLICATIONS

This application claims the benefit of PCT Application PCT/EP2015/068142, filed Aug. 6, 2015, which claims priority to German Application DE 10 2014 112 227.5, filed Aug. 26, 2014. The disclosures of the above applications are incorporated herein by reference.

FIELD OF THE INVENTION

The invention relates to a tank for an operating liquid for a motor vehicle. The tank is suitable in particular for storing a liquid additive for exhaust-gas purification in a motor vehicle.

BACKGROUND OF THE INVENTION

Exhaust-gas treatment devices for the purification of the exhaust gases of internal combustion engines in motor vehicles, which devices use a liquid additive for the exhaust-gas purification, are widely used. In exhaust-gas treatment devices, it is for example the case that the exhaust-gas purification method of selective catalytic reduction (SCR) is implemented, where nitrogen oxide compounds in the exhaust gas of an internal combustion engine are reduced with the aid of ammonia.

Ammonia is normally stored in motor vehicles not directly but rather in the form of a liquid ammonia precursor solution. Urea-water solution is particularly commonly used as an ammonia precursor solution. Urea-water solution is available with a urea content of 32.5 percent under the trade name AdBlue® as an operating liquid for exhaust-gas purification in motor vehicles. Urea-water solution may be converted into ammonia within the exhaust gas (within the exhaust-gas treatment device) or outside the exhaust gas (in a separate reactor provided for the purpose outside the exhaust-gas treatment device).

A problem with the provision of operating liquid for exhaust-gas purification in a motor vehicle is that the described operating liquids (in particular the described urea-water solution) may freeze at low temperatures. The urea-water solution with the urea water content of 32.5 percent freezes, for example, at −11° C. Tanks for storing the operating liquid must therefore be constructed such that they are able to withstand the ice pressure that is generated when freezing occurs. Furthermore, it is generally necessary for heating means to be provided by way of which the operating liquid may be melted if the operating liquid has frozen. Furthermore, it is necessary for tanks and delivery devices for delivering the liquid additive to be resistant to urea-water solution.

SUMMARY OF THE INVENTION

It is therefore an object of the present invention to describe a particularly advantageous tank for an operating liquid for a motor vehicle. The tank is suitable in particular for storing urea-water solution as operating liquid. It is however also possible for other liquids to be stored in the tank.

In one embodiment, the present invention is a tank for an operating liquid for a motor vehicle, with a tank wall composed of plastic, having an opening and an insert composed of metal arranged at the opening, and a flexible sealing element for the liquid-tight connection of the tank wall and of the insert to one another. Relative displacements between the tank wall and the insert occur at least in sections due to thermal expansions of the tank wall and of the insert, and the flexible sealing element is designed such that, on the insert and on the tank wall, respective sealing surfaces are formed against which the sealing element bears independently of the relative displacements.

The tank with the tank wall is preferably manufactured from plastic by way of an injection-molding process. The tank may have a highly complex tank geometry which is adapted to the structural space available for the tank in a motor vehicle.

In one embodiment, the insert composed of metal in the tank is a pot via which liquid may be extracted from the tank. The insert may also have a heating means by way of which liquid in the tank is heated. In another embodiment, the insert may be a swirl pot which at least regionally divides the tank which reduces sloshing movements of the operating liquid in the tank.

The insert composed of metal and the tank wall composed of plastic normally have coefficients of thermal expansion which differ significantly. Here, a coefficient of thermal expansion refers to a parameter which describes the thermal expansion as a result of temperature increases. The coefficient of thermal expansion normally has the unit μm/mK. In the case of a coefficient of thermal expansion of 20 μm/mK, a component which has a length of 1 meter at a reference temperature expands to a length of 1.002 meters if the temperature lies 100° K above the reference temperature. The component shortens to a length of 0.998 meters if the temperature lies 100° K. below the reference temperature. The actual expansion behaviour of a component is often not linear. The specifications for coefficient of thermal expansion are thus generally linear approximation values for the expansion behaviour of a work piece in the immediate vicinity of a reference temperature.

Owing to the fact that the tank wall and the insert are composed of different materials (plastic and metal respectively), the thermal expansions of the insert and of the tank wall typically differ. Therefore, the relative displacements between the tank wall and the insert, as described here, may occur if temperature fluctuations arise.

In the event of relative displacements, the geometrical center of gravity of the insert may shift completely relative to the geometric center of gravity of the tank or of the tank wall. It is however also possible for the geometrical centers of gravity of the insert and of the tank wall to be fixed relative to one another independently of thermal expansions, and for thermal displacements to occur only in sections, such that in each case only sections of the tank wall and of the tank wall are displaced relative to one another.

Sealing surfaces on the tank wall and on the insert refer here to surfaces which are always in contact with the sealing element independently of the temperature actually prevailing at the tank wall and at the insert. Thus, the sealing element does not lose contact with sealing surfaces as a result of relative displacements. In one embodiment, the sealing element is permanently fastened to the sealing surfaces, such that no relative displacements, or only limited relative displacements, may occur. In further design variants, the sealing element bears against the sealing surfaces, and it is possible, at the sealing surfaces, for relative movements between the sealing element and the insert or the tank wall to occur. The sealing surfaces on the insert and on the tank wall are however designed such (to be of such a size) that, at all occurring temperatures, the sealing surfaces are in each case covered by the sealing element. "Occurring temperatures" refers in this context to minimum and maximum temperatures to which a tank in a motor vehicle may commonly be exposed. The sealing surfaces and the sealing element are for example configured such that leak-tightness is ensured over a temperature range between −50° C. and +90° C. It is furthermore possible for sealing elements to be fixed to the insert and/or to the tank wall. The sealing surfaces are not wetted by the operating liquid, independently of thermal expansions in the stated temperature range. During the occurring thermal expansions, the sealing element never fully passes over wetted regions on the tank wall and on the insert.

The opening in which the insert is arranged is particularly preferably situated in a lower region or in a base region of the tank. The opening is particularly preferably provided in the tank wall in the tank base.

The tank is particularly preferable if the insert is a housing for accommodating a delivery unit for the delivery of operating liquid out of the tank.

A delivery unit preferably includes a pump for the delivery of the operating liquid, and possibly further components, such as for example sensors, valves, etc. A dosed supply of operating liquid out of the tank is preferably possible by way of the delivery unit.

Positioning a delivery unit with a housing on the base of the tank makes it possible for the liquid to be extracted from the tank relatively independently of the fill level of the liquid in the tank. A metallic housing for a delivery unit for delivering a liquid is particularly stable. Furthermore, a metallic housing is suitable in particular for conducting heat. A heater is preferably arranged in the insert or in the housing. Heat produced by the heater is transmitted by the insert or by the housing to the operating liquid in the tank.

The tank is particularly preferable if the opening has a diameter of greater than 100 millimeters. The opening preferably has a diameter of more than 120 mm, and very particularly preferably between 130 and 200 mm.

It has been found that, in the case of metallic inserts in a tank wall with a diameter of more than 100 mm, alternative concepts are necessary in order to ensure a reliable fluid-tight seal between the tank wall and the insert. In particular, it has been found that an adequate seal is not possible using classic seals (for example classic O-ring seals), because classic seals slide on the sealing surfaces on the tank wall and on the insert if relative displacements occur. In the case of diameters of the insert of more than 100 mm, the region in which the classic seals slide is generally so large that the sealing surfaces are completely wetted with the operating liquid. This generally leads to leakage at the sealing surfaces. The leakage is particularly pronounced if the tank is regularly exposed to temperature fluctuations. At the same time, inserts with a diameter of more than 100 millimeters are generally required in particular as a housing for delivery units. Only inserts or housings of this size offer enough space for all components of a delivery unit to be able to be accommodated therein.

The described seal concept firstly permits relative displacements in targeted fashion and secondly ensures reliable abutment or reliable coverage of sealing surfaces on the tank wall and on the insert. It is thus made possible firstly for such large diameters to be able to be used for openings in the tank wall or for metallic inserts and housings in a tank, and secondly for a permanent fluid-tight seal of the inserts and of the housings on the tank wall to be ensured.

The tank is furthermore advantageous if the flexible sealing element is a sealing ring which bears by way of a first abutment surface against the tank wall and by way of a second abutment surface against the insert, where the first abutment surface and the second abutment surface are larger than a maximum relative displacement between the tank wall and the insert which occurs owing to thermal expansions.

Here, it is the case in particular that a sealing ring is described which ensures not linear contact but rather areal contact between the tank wall and the sealing ring surface and between the insert and the sealing ring surface. In the event of relative displacements between the insert and the tank wall, between the insert and the sealing ring or between the tank wall and the sealing ring, there is then always, independently of temperature, a remaining surface which is completely covered by the sealing element.

The sealing element is in particular a sealing ring with a rectangular cross-sectional area. A sealing ring of this type has a large abutment surface against the insert or against the tank wall in relation to a sealing ring with a circular cross sectional area.

In some design variants, sealing rings are designed so as to roll on the tank wall and on the insert if the described relative displacements between the tank wall and the insert occur. In the case of such sealing rings, it is preferably ensured that a maximum rolling angle of the sealing rings is selected to be so small that, nevertheless, the sealing surfaces described further above on the insert and on the tank wall are maintained, which sealing surfaces are always completely covered by the sealing ring or by the sealing element independently of the thermal displacements.

The tank is furthermore advantageous if, in the event of thermal expansions, the flexible sealing element rolls on a first sealing surface on the tank wall and on a second sealing surface on the insert.

Rolling seals exhibit particularly little wear, because, in each case, no friction arises between the sealing element and the insert and between the sealing element and the tank wall as a result of relative displacements.

The tank is furthermore advantageous if the flexible sealing element is a tube-type sealing ring.

A tube-type sealing ring is a particular form of a sealing ring, which is internally hollow. A tube-type sealing ring is pressed flat against the sealing surfaces by way of a pressure force, thus yielding a relatively large sealing surface against the insert or against the tank wall. Tube-type sealing rings may be designed such that they roll on the insert and on the tank wall in the event of relative displacements between the tank wall and the insert. Alternatively or in addition, tube-type sealing rings may be configured so as to be displaced, and slide on the tank wall and/or on the insert, as a result of such relative displacements. Both variants are encompassed by the connection, described here, between tank wall and insert.

The tank is also advantageous if the flexible sealing element is a diaphragm, where a first section of the diaphragm is connected cohesively to the tank wall, and a second section of the diaphragm is connected cohesively to the metallic tank insert, and the diaphragm has, between the first section and the second section, a flexibility zone which compensates relative displacements owing to thermal expansions between the tank wall and the insert.

Such a sealing element in the form of a diaphragm may for example be welded by way of a welded connection to the tank wall and/or to the insert. It is also possible for a sealing element of this type to be adhesively bonded to the tank wall and/or to the insert. The sealing element in the form of a diaphragm is preferably flexible both in the flexibility zone and at the first section and the second section. At the first section and at the second section, flexibility is required in particular for being able to compensate locally limited thermal expansions. The material of the sealing element or of the diaphragm must, at the first section and at the second section, be capable of locally adapting to the thermal expansions of the tank wall and of the insert that occur at the connecting point. In the flexibility zone, the flexibility of the sealing element is required to ensure compensation of the relative displacements.

The tank wall and the insert are preferably connected to one another not only by way of the sealing element, but rather with a separate mounting means for the connection of tank wall and insert additionally being provided. Here, the separate mounting means preferably ensures mechanical fixing of the insert to the tank wall, where relative displacements are permitted by the separate mounting means. The separate mounting means is formed for example by a flange and a cover which brace the insert against the opening in the tank wall. A relative displacement of the insert perpendicular to the tank wall is prevented by way of the separate mounting means, whereas a relative displacement of the insert parallel to the tank wall is possible.

In a further preferred design variant, the insert is inserted into a section, which forms an intermediate component, of the tank wall. The intermediate component is connected to the (further) tank wall by way of a welded connection. The intermediate component forms a type of intermediate flange which serves for secure fluid-tight attachment of the metallic insert to the plastics tank wall and which thereby permits the mounting of the insert in the tank wall.

It is also sought here to describe a motor vehicle having an internal combustion engine, having an exhaust-gas treatment device with an SCR catalytic converter and having a tank as described above for storing and supplying operating liquid for the exhaust-gas purification.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5: shows a schematic diagram of displacements occurring in a described tank,
and
FIG. 6: shows a motor vehicle having a described tank.

DETAILED DESCRIPTION OF THE PREFERRED EMBODIMENTS

The following description of the preferred embodiment(s) is merely exemplary in nature and is in no way intended to limit the invention, its application, or uses.

Figure 2:
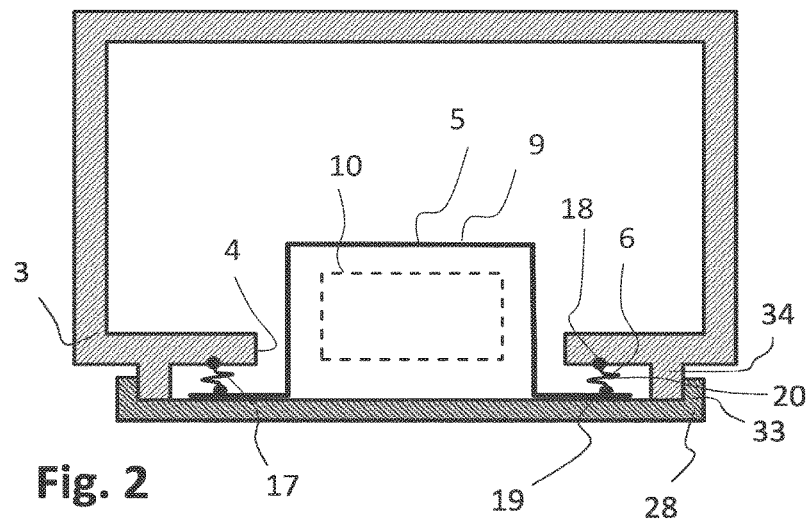
FIG. 2: shows a second embodiment of a described tank.
Figure 3:
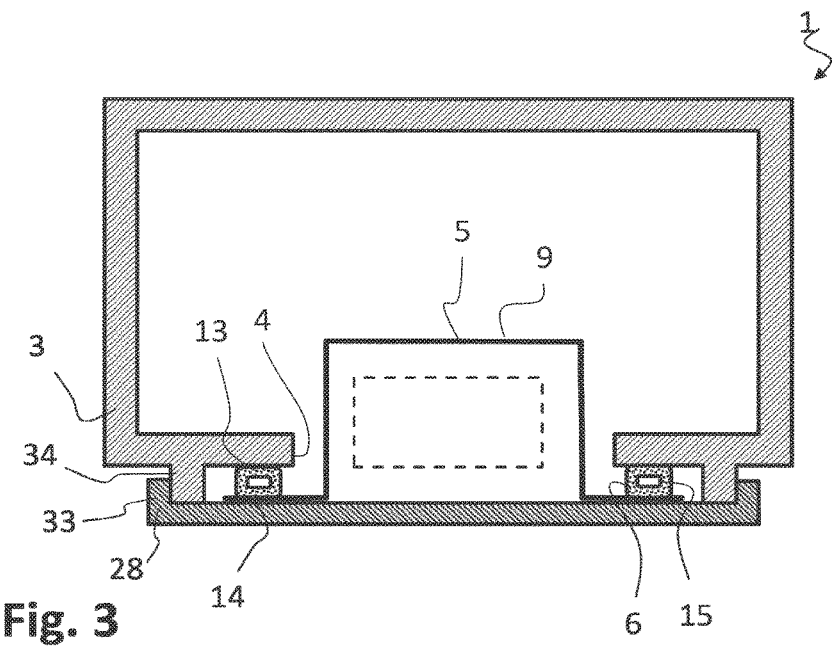
FIG. 3: shows a third embodiment of a described tank.
Figure 4:
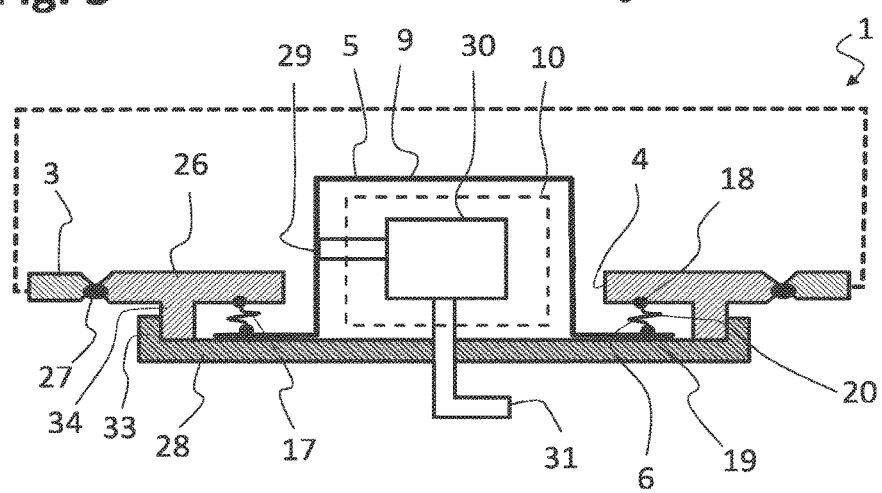
FIG. 4: shows a fourth embodiment of a described tank.

FIGS. 1, 2, 3 and 4 show in each case four different design variants of a described tank 1 with a tank wall 3. In the tank wall 3 there is provided an opening 4 into which there is inserted an insert 5 which is sealed off against the tank by way of a sealing element 6. In all of the design variants illustrated in FIGS. 1-4, the insert 5 is a housing 9 which is suitable for accommodating a delivery unit 10 for supplying liquid additive for exhaust-gas purification from the tank to an exhaust-gas treatment device. FIG. 4 illustrates the delivery unit in slightly more detail by way of an example, wherein the structure of a delivery unit 10 explained in FIG. 4 is also highly simplified. The delivery unit 10 has a pump 30 and extracts operating liquid from the tank 1 at a suction point 29 and supplies the operating liquid at the supply port 31. The supply port 31 serves for example for the attachment of a line (not illustrated in any more detail here) which leads to an injector for the dispensing of the operating liquid into an exhaust-gas treatment device.

Figure 1:
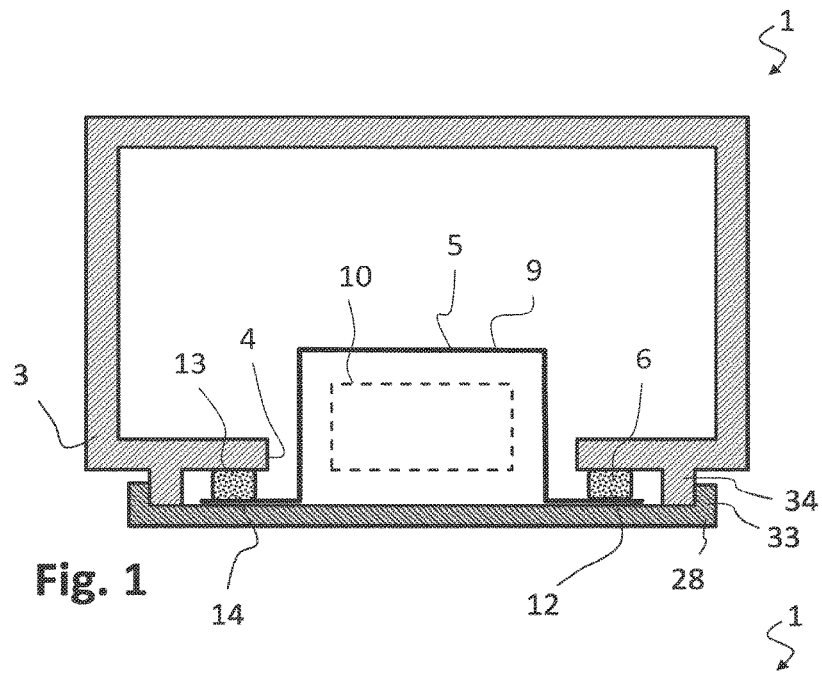
FIG. 1: shows a first embodiment of a described tank.

In the design variants in FIGS. 1 to 3, the insert 5 is fastened to the tank wall 3 in each case by way of a separate mounting means 33. The separate mounting means 33 includes a flange 34 on the tank wall 3 and a cover 28 which is fitted onto the flange 34 (for example by being screwed on or plugged on). The insert 5 is braced between the cover 28 and the tank wall 3. Thus, firstly, displacements of the insert 5 perpendicular to the tank wall 3 are prevented. Secondly, the mounting means 33 composed of flange 34 and cover 28 permits relative displacements between insert 5 and tank wall 3 parallel to the tank wall 3.

In the design variant in FIG. 1, the sealing element 6 is a sealing ring 12. The sealing ring bears against the insert by way of a second abutment surface 14 and against the tank wall 3 by way of a first abutment surface 13, and thus seals off the tank wall 3 and the insert 5 with respect to one another.

In the design variant in FIG. 2, the sealing element 6 is a diaphragm 17 which has a first section 18 which is fastened to the tank wall 3 and a second section 19 which is fastened to the insert 5, wherein, between the first section 18 and the second section 19, there is arranged a flexibility zone 20 which permits relative displacements between the insert 5 and the tank wall 3.

FIG. 3 shows a design variant of the sealing element 6 which is a tube-type sealing ring 15. A tube-type sealing ring 15 is particularly suitable for forming a rolling sealing element 6, because, in a tube-type sealing ring 15, less internal shear forces, which adversely affect the tube-type sealing ring 15, arise during a rolling movement.

The tank 1 is illustrated merely schematically in FIG. 4. Here, the insert 5 is inserted into a section of the tank wall 3 which forms an intermediate component 26. The intermediate component is connected to the further tank wall 3 by way of a welded connection 27. The intermediate component 26 forms a type of intermediate flange which serves for secure fluid-tight attachment of the metallic insert 5 to the plastics tank wall and which thereby permits the mounting of the insert 5 in the tank wall 3. In FIG. 4, the concept as per FIG. 2 is realized as the sealing concept for the insert 5 in the tank wall 3. The intermediate component 26 may however also be combined with the other sealing concepts described here (as per FIG. 1 or FIG. 3).

FIG. 5 describes the relative displacements 7 that may occur as a result of thermal expansions of the tank wall 3 and of the insert 5. FIG. 5a shows a situation in which the insert 5 and the tank wall 3 have been pulled apart to a particularly great extent. FIG. 5b shows a situation in which the insert 5 and the tank wall 3 bear particularly closely against one another. For example, the situation as per FIG. 5b exists in the case of particularly low (minimum) temperatures, whereas the situation as per FIG. 5a exists in the case of particularly high (maximum) temperatures. The assignment of minimum temperatures and maximum temperatures to figure parts a) and b) in this case is however merely exemplary. It is in fact also possible here (depending on tank geometry and coefficients of thermal expansion of tank wall and insert) for the exactly reversed situation to exist, such that FIG. 5b corresponds to maximum temperatures and FIG. 5a corresponds to minimum temperatures. It is possible to see in each case a first sealing surface 8 between the sealing element 6 and the tank wall 3 and a second sealing surface 16 between the insert and the sealing element 6, which sealing surfaces are in each case covered by the sealing element 6 independently of the position of the insert 5 and of the tank wall 3 relative to one another. It is to be pointed out that A for example indicates an arrow in which the maximum possible temperatures admissible for the tank prevail, whereas arrow B shows a situation in which the minimum temperatures possible for the tank prevail. Also indicated in FIG. 5 is a maximum rolling angle 32 through which the sealing element 6 rolls on the tank wall 3 and on the insert 5.

FIG. 6 shows a motor vehicle 2 having an internal combustion engine 22 and having an exhaust-gas treatment device 23, in which there is situated an SCR catalytic converter 24 for the purification of the exhaust gases of the internal combustion engine 22. The SCR catalytic converter 24 is fed with liquid additive for exhaust-gas purification by an injector 25, which liquid additive is supplied to the injector 25 from a tank 1 via a line 21 by a delivery unit 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. A tank for an operating liquid of a motor vehicle, comprising:
   a tank wall having an opening, the tank wall being made of plastic;
   an insert arranged such that the insert partially extends into the opening, the insert being made of metal;
   a flexible sealing element providing a liquid-tight connection between the tank wall and the insert, the flexible sealing element further comprising;
   a diaphragm;
   a first section being part of the diaphragm, the first section of the diaphragm being connected cohesively to the tank wall;
   a second section being part of the diaphragm, the second section of the diaphragm being connected cohesively to the metallic insert;
   a flexibility zone located between the first section and the second section, the flexibility zone being part of the diaphragm; and
   wherein the flexibility zone is in a non-contacting relationship with the tank wall and the metallic insert, and the flexibility zone compensates for relative displacement between the tank wall and the insert due to thermal expansion.

2. The tank of claim 1, the insert further comprising a housing for accommodating a delivery unit for the delivery of operating liquid out of the tank.

3. The tank of claim 1, wherein the opening has a diameter of greater than 100 millimeters.

4. The tank of claim 1, the motor vehicle further comprising:
   an internal combustion engine;
   an exhaust-gas treatment device operable with the internal combustion engine for purifying exhaust gas; and
   an SCR catalytic converter being part of the exhaust-gas treatment device;
   wherein the tank stores and supplies liquid additive for exhaust-gas purification performed by the exhaust-gas treatment device.

* * * * *